(12) United States Patent
Bolme et al.

(10) Patent No.: US 8,520,956 B2
(45) Date of Patent: Aug. 27, 2013

(54) OPTIMIZED CORRELATION FILTERS FOR SIGNAL PROCESSING

(75) Inventors: David S. Bolme, Fort Collins, CO (US);
J. Ross Beveridge, Fort Collins, CO (US); Bruce A. Draper, Fort Collins, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 598 days.

(21) Appl. No.: 12/797,241

(22) Filed: Jun. 9, 2010

(65) Prior Publication Data

US 2010/0322534 A1 Dec. 23, 2010

Related U.S. Application Data

(60) Provisional application No. 61/293,033, filed on Jan. 7, 2010, provisional application No. 61/243,098, filed on Sep. 16, 2009, provisional application No. 61/219,163, filed on Jun. 22, 2009, provisional application No. 61/185,267, filed on Sep. 9, 2009.

(51) Int. Cl.
*G06K 9/62* (2006.01)
*G06K 9/68* (2006.01)
*G06K 9/00* (2006.01)

(52) U.S. Cl.
USPC ............ 382/209; 382/218; 382/219; 382/103

(58) Field of Classification Search
None
See application file for complete search history.

(56) References Cited

U.S. PATENT DOCUMENTS

| | | | |
|---|---|---|---|
| 2003/0016868 A1* | 1/2003 | Oh et al. | 382/190 |
| 2004/0151371 A1* | 8/2004 | Chen et al. | 382/165 |
| 2005/0219361 A1* | 10/2005 | Aoki et al. | 348/159 |
| 2007/0196029 A1* | 8/2007 | Kondo et al. | 382/274 |
| 2008/0062262 A1* | 3/2008 | Perron et al. | 348/82 |
| 2009/0297021 A1* | 12/2009 | Islam et al. | 382/160 |
| 2012/0307116 A1* | 12/2012 | Lansel et al. | 348/273 |

* cited by examiner

*Primary Examiner* — Randolph I Chu
(74) *Attorney, Agent, or Firm* — Volpe and Koenig, P.C.

(57) ABSTRACT

A system and method for generating and using a correlation filter. The method includes providing a plurality of training images, each training image being paired with an associated target correlation plane. Each training image and target correlation plane pair is processed. A final filter is generated, wherein the final filter is useable to generate a filtered output correlation plane of each training image. The final filter is selected to collectively minimize errors between the filtered output correlation plane of each training image and its associated target correlation plane. The final filter can be used in a wide variety of still image and video based object location and tracking applications.

27 Claims, 14 Drawing Sheets

OPTIMIZED CORRELATION FILTERS FOR SIGNAL PROCESSING

CROSS REFERENCE TO RELATED APPLICATIONS

This application claims the benefit of U.S. Provisional Application Ser. No. 61/185,267 filed Jun. 9, 2009, U.S. Provisional Application Ser. No. 61/219,163 filed Jun. 22, 2009, U.S. Provisional Application Ser. No. 61/243,098 filed Sep. 16, 2009 and U.S. Provisional Application Ser. No. 61/293,033 filed Jan. 7, 2010, which are incorporated by reference as if fully set forth.

FIELD OF INVENTION

This invention relates to image processing systems and methods, and more particularly, to systems and methods for generating and using optimized correlation filters for computer vision and signal processing.

BACKGROUND

Filtering is a basic operation used to solve many problems in computer vision and signal processing. Filtering can perform a number of important tasks, including noise removal, edge enhancement, derivative estimation, and object detection. Because filtering has so many uses, it plays a roll in many application areas including audio processing, video processing, and higher dimensional signal analysis such as medical tomography or multispectral image processing.

Finding objects in images is an important and challenging computer vision problem. This problem can take many different forms but usually includes determining if an object is present in an image or where in the image an object is located. Object detection tasks can be difficult to solve because the appearance of objects can change substantially due to simple changes in the conditions under which the object is viewed. These include changes in pose, lighting, nonrigid deformation, or natural variations within an objects class. For these reasons, designing and training algorithms that perform these tasks is difficult.

Filtering is frequently used to correlate one signal with another. Correlation is used in both signal and image processing because it is both simple and fast. For object detection, images are correlated with filters which are cropped examples or templates hand selected from training images. Correlation can be used to detect both the presence and location of an object because it provides a similarity score for every pixel in the image. The object is considered "present" where the correlation output exceeds a threshold. The local maximum provides an estimate of the location.

This technique rarely works for challenging detection problems because the templates fail to represent variations in appearance and poorly discriminate in the presence of a complex background. For these reasons, the majority of object detection research has focused on designing more complicated object representations and more robust classification schemes. While these techniques often improve the accuracy, the improved performance comes with a price paid in terms of longer run times and complex up front training protocols.

Accordingly, it would be beneficial to provide new ways to design filters that are much better at discriminating between targets and background. It would also be beneficial to provide an improved filter performance without the need for longer run times and complex up front training protocols.

SUMMARY

A system and method for generating and using a correlation filter. The method includes providing a plurality of training images, each training image being paired with an associated target correlation plane. Each training image and target correlation plane pair is processed. A final filter is generated, wherein the final filter is useable to generate a filtered output correlation plane of each training image. The final filter is selected to collectively minimize errors between the filtered output correlation plane of each training image and its associated target correlation plane.

Processing each training image and target correlation plane pair can be accomplished by performing a correlation function and generating an exact filter for each training image and combining the exact filters for each of the plurality of training images and generating the final filter. The plurality of training images and the associated target output images can be transformed from a spatial domain to a frequency domain. An exact filter can be generated for each training image in the frequency domain. Transforming can be performed by using a transform that satisfies the Convolution Theorem (e.g., Fourier transform). An exact filter can be generated by dividing each target image (element by element) by its associated training image. The exact filters can be combined via an averaging function.

In another embodiment, processing each training image and target correlation plane pair can be accomplished by solving for a final filter that collectively minimizes the sum of squared errors between the filtered output correlation plane of each training image and its associated target correlation plane.

In another embodiment, processing each training image and target correlation plane pair can be accomplished by solving for a final filter using a gradient descent function to collectively minimize errors between the filtered output correlation plane of each training image and its associated target correlation plane.

Regularization can be performed by increasing a value of every element in each training image with a regularization parameter. The training image set can be extended by generating at least one perturbed image for each of the plurality of training images.

The method is applicable to still images as well as video. The final filter can be trained based on a plurality of frames in a video sequence. The final filter can be applied to a subsequent frame in a video sequence in order to determine whether an object is present in the subsequent video frame. Each video frame can be divided into a plurality of detection regions. The final filter can be applied to each detection region.

The method can also be used to track an object. The final filter can be trained based on a first frame in a video sequence. The final filter is applied to a subsequent frame in a video sequence in order to determine a location of an object. A new target correlation plane is generated based on the object location. The final filter is updated based on the new target correlation plane. More emphasis can be placed on minimizing errors on newer video frames than older video frames. The object location can be used to control a camera pan-tilt-zoom (PTZ) setting, a vehicle speed and/or vehicle course.

DETAILED DESCRIPTION OF THE EMBODIMENTS

Figure 1:
FIG. 1 is shows an overview of the Average of Synthetic Exact Filters (ASEF) training process for an eye detection filter.

Disclosed herein are techniques for learning filters that optimally map input images to their ideal output. By using this approach, the filters produce high responses for target objects while also learning to suppress the response to common background distractors. The embodiments disclosed herein are easy to implement and provide many advantages over alternative filter training techniques, and even outperform complex appearance models and detectors. These filters are therefore much more accurate than simple templates without sacrificing the speed and simplicity of correlation based image processing.

In template matching, object appearance is captured using sample images. Typically, a template (or filter) is an example image that has been carefully cropped and centered on the target object. Template matching as an approach to object recognition also carries with it a straightforward concept of similarity based upon comparing pixels. The similarity of one image to another can be measured using a simple dot product. If we define h to be a template, and f is a vector form of an image, the similarity of those two images is computed as the dot product of the pixel values:

$$S(f, h) = f \cdot h = \sum_i f_i h_i$$

where i indexes the pixels in those images. In theory, if the two images are of the same object viewed in the same manner, then the pixel values will be similar and the resulting dot product will results in high values. On the other hand, if the two images are of different objects, the pixel values will be different and the dot product will produce small values.

Therefore, objects can be detected if this dot product exceeds a threshold, in this case $S_{thresh}$.

$$S(f,h) > S_{thresh}$$

In object detection it is often unknown where an object will appear in an image. To find the object, the template is correlated with the image.

$$C = f * h$$

Correlation computes the dot product for each possible alignment of the filter relative to the image. The output of correlation is a new image, C, where each pixel value in C contains the result of the dot product between a translated version of f and the template h. Therefore, each pixel of C indicates how similar that region of image f is to the template. Object detection is then performed by finding pixels of C which exceed the threshold. These local maxima are often referred to as correlation peaks, and they indicate the presence and location of the target object.

For object detection, correlation has a number of attractive properties:

a) Correlation based object detection is easy to implement. Because correlation is commonly used in signal and image processing, correlation libraries are available in most computer languages and for most hardware platforms including Digital Signal Processors (DSP) and recent Graphics Processing Units (GPU). Correlation is even easy to implement from scratch, although performance will most likely be slower than that which is achieved when using specialized libraries.

b) Correlation is fast. Because correlation is a highly regular computational operation, it can be computed very efficiently on modern processors. Furthermore, the dot product and templates used in correlation are also much simpler than many of the alternative classifier functions and appearance models that are used in many alternative object detection techniques. In addition, using smart algorithms based on the Convolution Theorem or separable convolution can speed up this computation even more. This results in extremely fast detection algorithms.

c) Detection is fast and simple. After computing the correlation image, the detection step is simple to implement and fast to execute; all that is required is to scan the correlation image for one or several local maximums.

The ability of template matching to produce good peaks depends upon a number of conditions including the following:

1) Objects of the same class have similar appearance.
2) The images of those objects are taken under similar conditions.
3) Objects of different classes have different appearance and therefore produce different patterns of pixels.

For images where these constraints are met, template matching will perform very well. Typically these tend to be situations where all aspects of the imaging process can be carefully controlled, such as monitoring products on an assembly line. Another example is when the two images being compared are taken of the same object, are taken at approximately the same time, and are taken from approximately the same viewpoint. Real world tasks where these conditions are met include image registration, manufactured parts inspection, and video stabilization.

In cases where an input image is altered (e.g., small changes to its size and rotation) simple template matching performance degrades rapidly. To the human eye such altered images are still very similar to the template. However, the peak in the correlation output is not nearly as strong nor as compact as when using an unaltered image. Under these conditions, it is much more difficult to determine the presence or location of an object.

In order to overcome these problems, a correlation filter can be generated as follows. A plurality of training images are provided. Each training image is paired with an associated target correlation plane. Each of the training image-target correlation plane pairs is processed to generate a final filter. The final filter is generally useable to generate a filtered output correlation plane of each training image. The final filter is selected to collectively minimize errors between the filtered output correlation plane of each training image and its associated target correlation plane. The selection of the final filter can be accomplished using several techniques as discussed in more detail below. It is understood that the techniques disclosed herein are applicable to video and still imagery from a wide variety of sensors that function along the entire electromagnetic spectrum and can be applied to a wide variety of fields, including but not limited to: medical imagery (X-Ray, CT, MRI, ultrasound and microscopic imagery) biometric imagery, video gaming systems, aerial and ground based security and surveillance imagery, radar imagery, lidar imagery, target recognition systems, guidance systems and the like.

Exact Filters

Consider the problem of constructing a filter to detect a particular type of object. A filter is desired that produces a strong peak where the targets are present and zero values elsewhere in the correlation output. A filter can be constructed from a set of N training images $\{f_1; f_2; \ldots, f_N\}$ which include examples of both targets of interest and also background and other distractors. The Optimized Correlation Output Filter (OCOF) techniques disclosed herein learn a filter h which when correlated with those training images produces a peak near the center of the target(s) but also produces values close to zero elsewhere. Prior filter training techniques solve this problem by cropping examples of the targets out of the training images. OCOFs take a different approach; they synthetically generate the desired output and then learn a filter that maps the training images to those synthetic outputs.

The first step is to create a set of target outputs $\{g_1; g_2; \ldots, g_N\}$ that have peaks where the targets are located in the corresponding training images. Here it is assumed that $g_i$ is the sum of two dimensional Gaussians centered at the targets locations $(x_j; y_j)$ where j indexes targets in the $i_{th}$ training image and $\rho$ specifies the radius of the peak:

$$g_i = \sum_j e^{-\frac{(x-x_j)^2+(y-y_j)^2}{\sigma^2}}$$

The filter learning task then reduces to the problem of solving for a filter h which satisfies the following relation:

$$g_i = h * f_i$$

In the spatial domain finding a good filter h is a difficult task. The problem can be simplified by transforming to the Fourier domain. Because correlation in the Fourier domain is an element-wise multiplication, solving this problem leads to element-wise divisions. Keeping with the notation where capital letters indicate images in the Fourier domain and $\odot$ indicates an element-wise multiplication, the previous equation becomes:

$$G_i = H^* \odot F_i$$

When there is only one training image, solving this equation for the filter results in an element-wise division:

$$H_i^* = \frac{G_i}{F_i}$$

The term $H_i^*$ is called an exact filter because it exactly transforms $f_i$ to $g_i$. The filter is indexed by i which indicates this particular exact filter is associated with the $i_{th}$ training image. Using simple manipulations $H_i^*$ can be computed as:

$$H_i^* = \frac{G_i \odot F_i^*}{F_i \odot F_i^*}$$

This equation has desirable properties. First, this is the standard way to implement the complex division. The denominator $F_i \odot F_i^*$ will only result in real positive values. The complex division is therefore straight forward because inverting the real valued denominator is a well defined operation. Second, the numerator and denominators have nice interpretations: the numerator is the correlation of $g_i$ with $f_i$ and the denominator is the energy spectrum of $f_i$. This formulation can also be used to add a simple regularization term which improves the stability of the training process.

Average of Synthetic Exact Filters (ASEF)

One problem with exact filters is that they perform poorly when tested on images that are different than the training images. In this embodiment, to produce a filter that generalizes across the entire training set, an average of multiple exact filters is computed. Averaging emphasizes features common across training examples while suppressing idiosyncratic features of single training instances.

FIG. 1 shows an overview of the Average of Synthetic Exact Filters (ASEF) training process for an eye detection filter. In this example, the training method is directed to a filter that responds to the left eye. The image $f_i$ is an image in the training set and $g_i$ is the corresponding desired filter output (target correlation plane). A correlation filter $h_i$ is produced in the Fourier domain that exactly transforms $f_i$ to $g^i$. It is readily apparent that that the exact filters are specific to each training image and do not have the appearance of an eye. The exact filters for each training image look like static and will probably not generalize to other images. The bottom row shows the final ASEF correlation filter, computed by combining 7500 exact filters. In this example, the final filter is produced by taking the average of 1500 training images with 5 perturbations each. The use of perturbed images to extend the training set is discussed in more detail below.

Because the Fourier transform is a linear operation, the average can be computed in either the Fourier or the spatial domain.

$$H_\mu^* = \frac{1}{N}\sum_{i=1}^{N} H_i^*$$

$$h_\mu = \frac{1}{N}\sum_{i=1}^{N} h_i$$

Where $H_\mu^*$ or $h_\mu$ are ASEF filters. Note that if computed in the spatial domain the exact filters can be cropped before averaging, which allows ASEF filters to be constructed from training images of different size.

Figure 2:
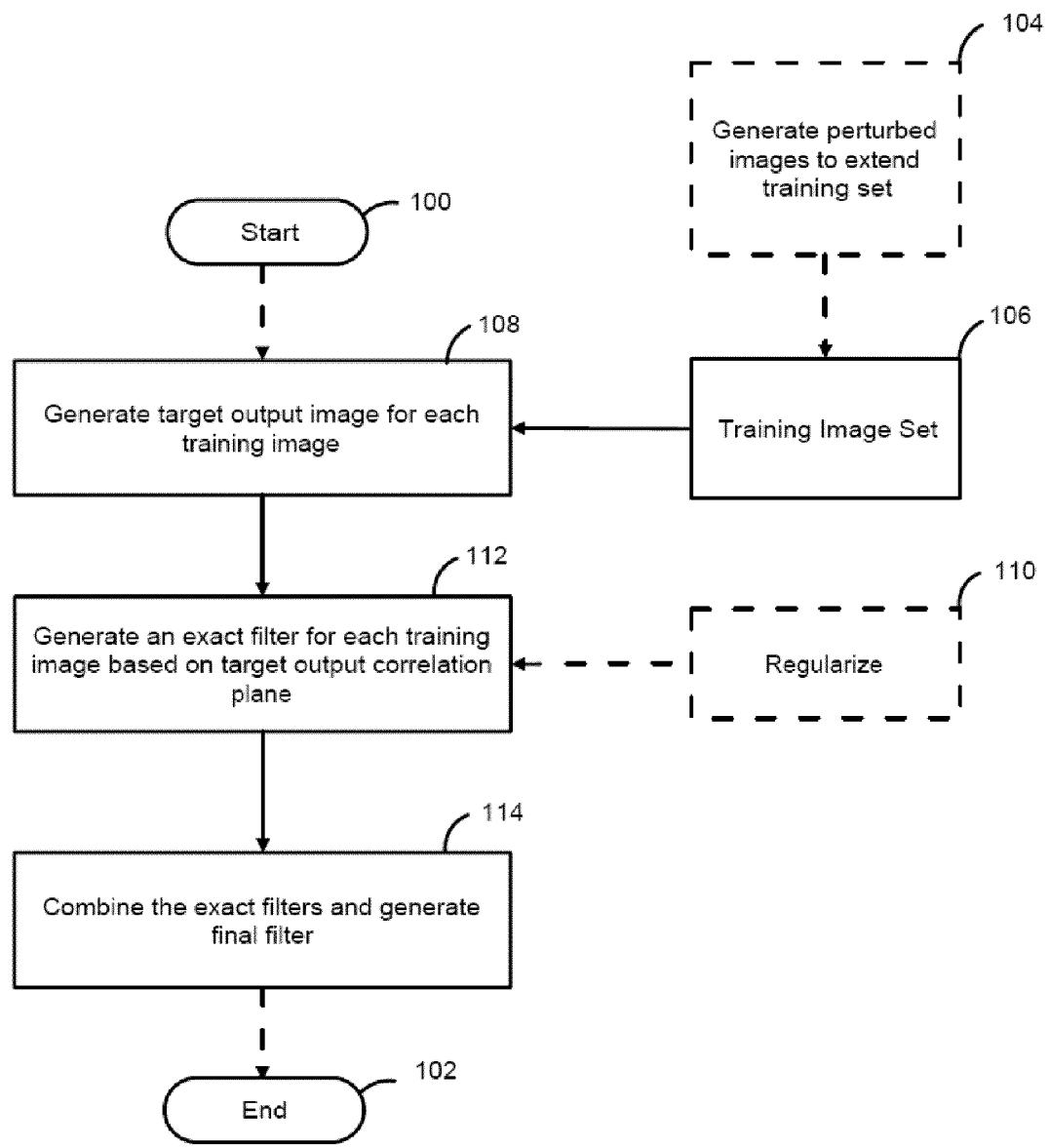
FIG. 2 a flow chart showing the basic steps for generating an ASEF filter.

FIG. 2 is a flow chart showing the basic steps for generating an ASEF filter. It is understood that all of the flowcharts disclosed herein are illustrative only. For example, other program entry and exit points, time out functions, error checking routines and the like (not shown) would normally be implemented in software/hardware. It is also understood that such hardware/software can be implemented to run continuously. Accordingly the start block and end blocks are intended to indicate logical beginning and ending points of a portion of code that can be integrated into a main program, library or the like and executed as needed. In this example, a plurality of training images are provided at block 106. The training images can be stored in a variety of image file formats in compressed or uncompressed form (e.g., Jpeg, Tiff, Bmp, Raw, Gif, Png and the like). The training images can be stored in a remote or local file folder, database or the like.

ASEF can require a lot of training data to converge to a good filter. The training set can be augmented by generating multiple copies of each training image with induced perturbations as shown by block 104. In general, perturbations that introduce small variations in rotation, scale, and translation are beneficial to producing robust filters because they expose the filters to a greater variety of images. This family of transforms also focuses the filter on regions near the peaks, producing a filter that emphasizes the image data near the target object.

A target output image is generated for each training image in the training image set as show by block 108. An exact filter is generated for each training image based on the target output image. This can be accomplished by transforming the plurality of training images and the associated target output images from the spatial domain to the frequency domain. This generates an output image correlation plane and a training image correlation plane pair for each training image in the training image set. In this example, a Fourier transform is used. However, other transforms that satisfy the convolution theorem are also suitable for use in generating an ASEF filter.

The exact filter can then be generated by dividing each target image correlation plane by its associated training image correlation plane as shown by block 112. As discussed above, this can be carried out by an element-wise division. The exact filters are combined to generate the exact filter as shown in block 114. This can be accomplished by averaging all of the exact filters.

In order to improve filter stability, the data can be regularized as shown by block 110. Regularization is a simple way to improve the stability of the filter training process. The process used to compute exact filters as discussed herein can lead to an inverse problem. Numerically, the number of constraints on an exact filter is equal to the number of unknowns. As a result in most cases there is an exact filter that maps an input image exactly to its desired output. One interesting case is when a frequency in the Fourier Transform of the training image contains zero energy. Because the closed form solution to computing the exact filter requires an element-wise division by the energy spectrum this operation is a divide by zero and has no solution. In other words, division by the training image is undefined for that frequency.

Adding regularization to the general ASEF equation is straight forward. The denominator $F_i \odot F_i^*$ is actually the energy spectrum of the training image: $F \odot F^*$. A nice property of this term (each element is multiplied by its complex conjugate) is that each element in the denominator is both real and positive. Regularizing is performed by simply adding a small value to every element: $F \odot F^* + \epsilon$ where $\epsilon$ is the regularization parameter. With regularization, the equation for an exact filter becomes:

$$H_i^* = \frac{G_i \odot F_i^*}{F_i \odot F_i^* + \epsilon}$$

Exact filters computed using this method are much more stable. The impact on ASEF, is that the filters can be trained on fewer images with little risk of any one exact filter dominating the averaging process. The resulting ASEF filter is computed as:

$$H_i^* = \frac{1}{N} \sum_i \frac{G_i \odot F_i^*}{F_i \odot F_i^* + \epsilon}$$

As discussed above, ASEF can require a lot of training data to converge to a good filter.

Minimizing the Output Sum of Squared Error (MOSSE)

MOSSE is an algorithm for producing ASEF-like filters from fewer training images. Like ASEF, it needs a set of training images $f_i$ and training outputs $g_i$. To find a filter that maps training inputs to the desired training outputs, MOSSE finds a filter H that minimizes the sum of squared error between the actual output of the correlation and the desired output of the correlation. This minimization problem takes the form:

$$H^* = \min_{H^*} \sum_i |F_i \odot H^* - G_i|^2$$

As discussed above, prior methods work under the assumption that the target is always carefully centered in $f_i$ and that the output ($g_i$) was fixed for the entire training set. Customizing every $g_i$ is a unique concept used by the filters disclosed herein. As a result, the target is not always centered, and the peak in $g_i$ moves to follow the target in $f_i$. It is also more general in the sense that $g_i$ can have any shape. Because correlation in the Fourier domain is an element-wise multiplication, each element of the filter H can be optimized independently. The optimization problem can therefore be transformed from a multivariate optimization problem to a problem that optimizes each element of H independently.

$$H_{\omega\nu} = \min_{H_{\omega\nu}} \sum_i |F_{i\omega\nu} H_{\omega\nu}^* - G_{i\omega\nu}|^2$$

where $\omega$ and $\nu$ index frequencies.

This function is real valued, positive, and convex so it will have only a single optima. Normally to find the optima of a function, the stable points are found by setting the derivative equal to zero and then solving for the variable of interest. Finding the stable point for this function is different because it is a real valued function of a complex variable. Care needs to be taken to solve this problem correctly. The function is first rewritten in terms of both $H_{\omega\nu}$ and $H_{\omega\nu}^*$. Then, the partial with respect to $H_{\omega\nu}^*$ is set equal to zero, while treating H as an independent variable.

$$0 = \frac{\partial}{\partial H^*_{\omega v}} \sum_i |F_{i\omega v} H^*_{\omega v} - G_{i\omega v}|^2$$

It can be shown that any $H_{\omega v}$ which satisfies this equation is a stable point. Transforming this equation leads to:

$$0 = \frac{\partial}{\partial H^*_{\omega v}} \sum_i (F_{i\omega v} H^*_{\omega v} - G_{i\omega v})(F_{i\omega v} H^*_{\omega v} - G_{i\omega v})^*$$

$$0 = \frac{\partial}{\partial H^*_{\omega v}} \sum_i [(F_{i\omega v} H^*_{\omega v})(F_{i\omega v} H^*_{\omega v})^* -$$

$$(F_{i\omega v} H^*_{\omega v}) G^*_{i\omega v} - G_{i\omega v}(F_{i\omega v} H^*_{\omega v})^* + G_{i\omega v} G^*_{i\omega v}]$$

$$0 = \frac{\partial}{\partial H^*_{\omega v}} \sum_i F_{i\omega v} F^*_{i\omega v} H_{\omega v} H^*_{\omega v} - F_{i\omega v} G^*_{i\omega v} H^*_{\omega v} - F^*_{i\omega v} G_{i\omega v} H_{\omega v} + G_{i\omega v} G^*_{i\omega v}$$

The next step is to compute the partial derivative. The last two terms in the previous equation drop out because we are treating $H_{\omega v}$ as an independent variable:

$$0 = \sum_i [F_{i\omega v} F^*_{i\omega v} H_{\omega v} - F_{i\omega v} G^*_{i\omega v}]$$

We can then distribute the summation and solve for $H_{\omega v}$.

$$H_{\omega v} = \frac{\sum_i F_{i\omega v} G^*_{i\omega v}}{\sum_i F_{i\omega v} F^*_{i\omega v}}$$

Finally, by performing some simple manipulations and solving for the filter H*, the MOSSE filter can be written in the original array notation as:

$$H^* = \frac{\sum_i G_i \odot F^*_i}{\sum_i F_i \odot F^*_i}$$

In general, the MOSSE filter directly solves for a final filter that collectively minimizes the sum of squared errors between the filtered output correlation plane of each training image and its associated target correlation plane.

Adding regularization to the general MOSSE equation is also straight forward. MOSSE is less likely to have any one frequency be particularly small because the denominator is summed over the set of all training images and because all elements in that sum are real positive numbers. This makes MOSSE naturally more stable. Even so, regularization is still useful and helps to further stabilize the MOSSE training process. With regularization, the MOSSE filter becomes:

$$H^* = \frac{\sum_i G_i \odot F^*_i}{\sum_i F_i \odot F^*_i + \epsilon}$$

Figure 3:
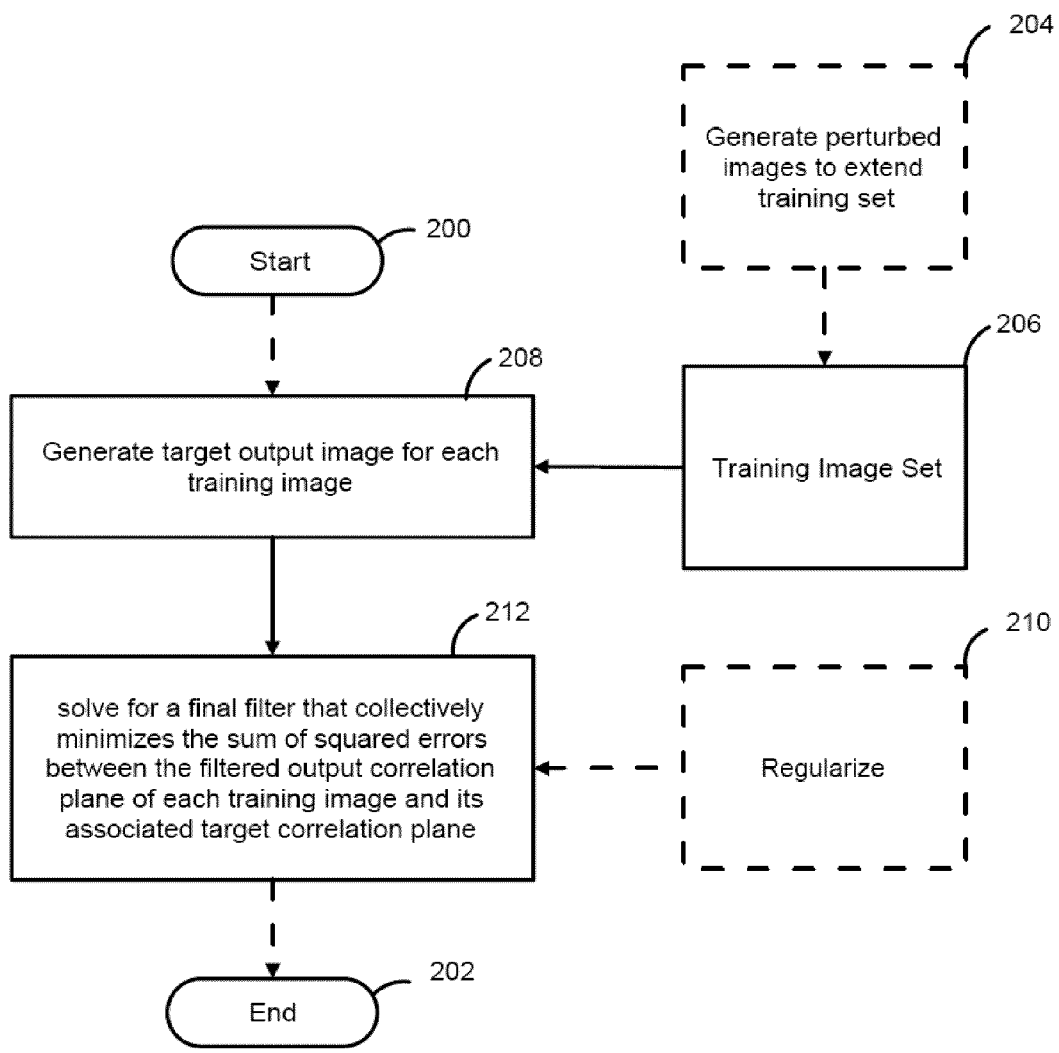
FIG. 3 is a flow chart showing the basic steps for generating an MOSSE filter.

FIG. 3 is a flow chart showing the basic steps for generating a MOSSE filter. In this example, a plurality of training images are provided at block 206. The training images can be stored in a variety of image file formats in compressed or uncompressed form (e.g., Jpeg, Tiff, Bmp, Raw, Gif, Png and the like). The training images can be stored in a remote or local file folder, database or the like.

MOSSE typically requires less training data that ASEF to converge to a good filter. However, the training set can be augmented by generating multiple copies of each training image with induced perturbations as shown by block 204. A target output image is generated for each training image in the training image set as show by block 208. An exact filter is generated by solving for a final filter that collectively minimizes the sum of squared errors between the filtered output correlation plane of each training image and its associated target correlation plane as shown by block 212. This can be accomplished by transforming the plurality of training images and the associated target output images from the spatial domain to the frequency domain. A function is set up to minimize squared errors by computing the derivative of the function and setting the result to zero in order to locate the minimum. As discussed above, a Fourier transform can be used or any other transform that satisfies the convolution theorem. In order to improve filter stability, the data can be regularized as shown by block 210.

Cost Function Minimizing Filters and Gradient Descent

This section discloses a filter that optimizes any differentiable cost function computed over the output. This technique allows additional flexibility in how filters are trained but also introduces additional complexity. Many of the benefits of ASEF and MOSSE are retained, such as the ability to control the entire convolution output and to train on multiple targets per training image.

In this more general approach, training starts by defining a cost function C that is a function of the filter output and ground truth for the training image. It then uses the derivative of the cost function with respect to the filter to quickly converge to a local optimum using standard nonlinear gradient descent optimization algorithms.

Here the correlation output for the current training image is referred to as g':

$$g'_i = \mathcal{F}^{-1}(F_i \odot H')$$

This example will minimize the same sum of squared error function optimized by MOSSE between the filtered output correlation plane its associated target correlation plane:

$$C(g'_i, g_i) = \sum_i |g_i - g'_i|^2$$

The next step is to compute the gradient of the cost function with respect to the filter output g'. In this case the gradient is simply:

$$\nabla_{g'di\ i} C(g'_i, g_i) = 2(g_i - g')$$

By applying the chain rule and the convolution theorem the gradient of the cost function with respect to the filter h' can be quickly computed.

$$\nabla_{h'} C(g'_i, g_i) = \mathcal{F}(F_i \odot \mathcal{F}^{-1}(\nabla_{g'} C(g'_i, g_i)))$$

Finally, a nonlinear gradient descent algorithm is used to solve for the true optimum. Often these optimization algorithms require the cost and gradient for the entire training set so the average cost can be computed:

$$C(h') = \frac{1}{N}\sum_{i=1}^{N} C(g', g_i)$$

$$\nabla_{h'} C(h') = \frac{1}{N}\sum_{i=1}^{N} \nabla_{h'} C(g', g_i)$$

This embodiment is more complex than ASEF or MOSSE and therefore requires more care during training. For example, the approach can experience some of the same problems as any other gradient descent algorithm. First, if the cost function is not convex than the process used to search for the optimal filter can get stuck in local optima. It is therefore important to carefully choose good cost functions and carefully select the starting point for the search. Second, optimization often encounters regions that are ill conditioned and may require optimization techniques that can handle such conditions such as nonlinear conjugate gradient descent. Finally, some cost functions have a tendency to over-fit the training set and therefore use of a validation set to detect over-fitting is recommended.

Figure 4:
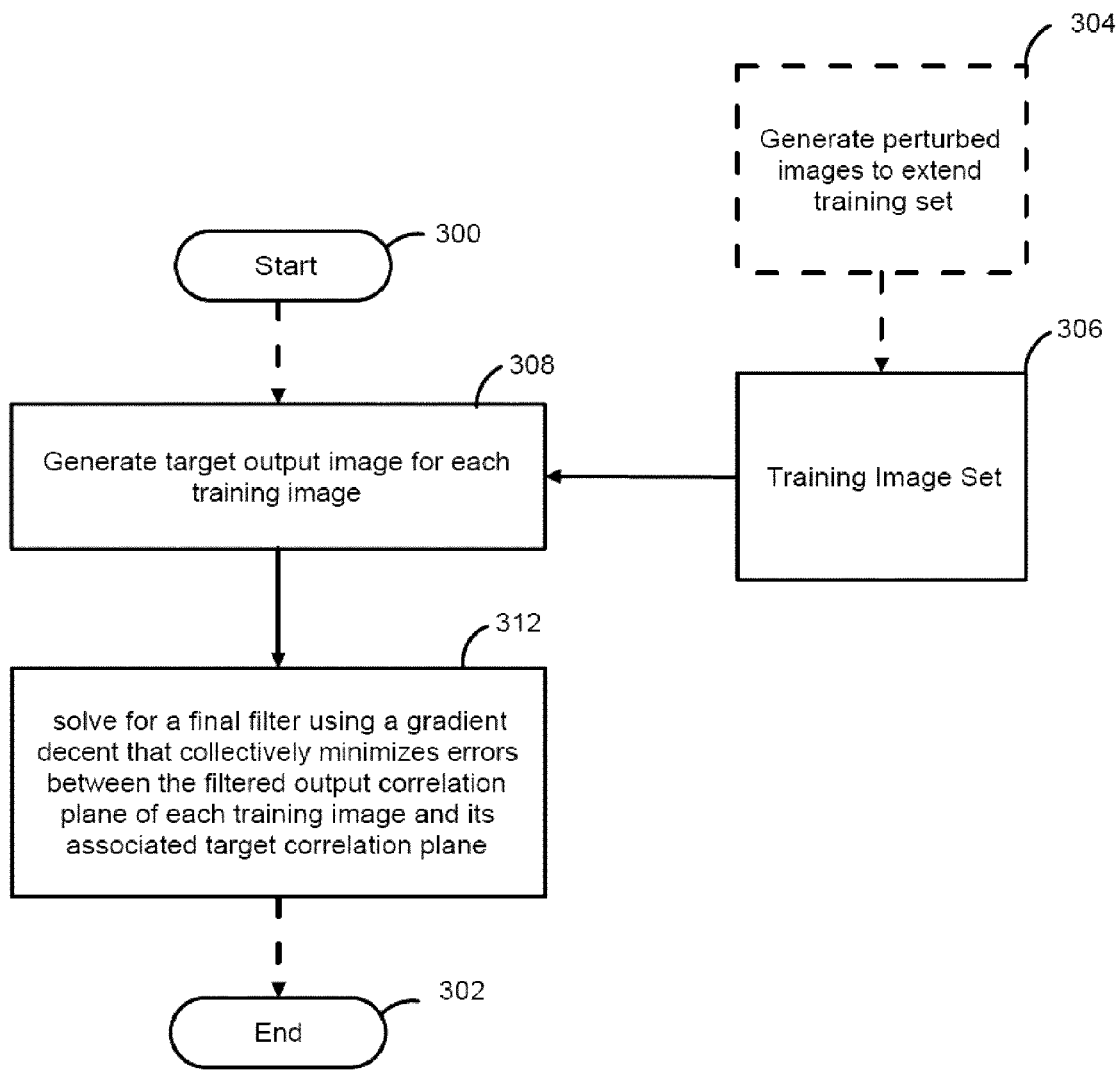
FIG. 4 is a flow chart showing the basic steps for generating a cost function minimizing filter using gradient descent.

FIG. 4 is a flow chart showing the basic steps for generating a cost function minimizing filter using gradient descent. In this example, a plurality of training images are provided at block 306. The training images can be stored in a variety of image file formats in compressed or uncompressed form (e.g., Jpeg, Tiff, Bmp, Raw, Gif, Png and the like). The training images can be stored in a remote or local file folder, database or the like.

A cost function minimizing filter typically requires less training data that ASEF to converge to a good filter. However, the training set can be augmented by generating multiple copies of each training image with induced perturbations as shown by block 304. A target output image is generated for each training image in the training image set as shown by block 308. An exact filter is generated by solving for a final filter using a gradient descent function to collectively minimize errors between the filtered output correlation plane of each training image and its associated target correlation plane as shown by block 312. This can be accomplished by transforming the plurality of training images and the associated target output images from the spatial domain to the frequency domain. A function is set up to minimize errors by finding a minimum using gradient descent. As discussed above, a Fourier transform can be used or any other transform that satisfies the convolution theorem.

Basic System Implementation

Figure 5:
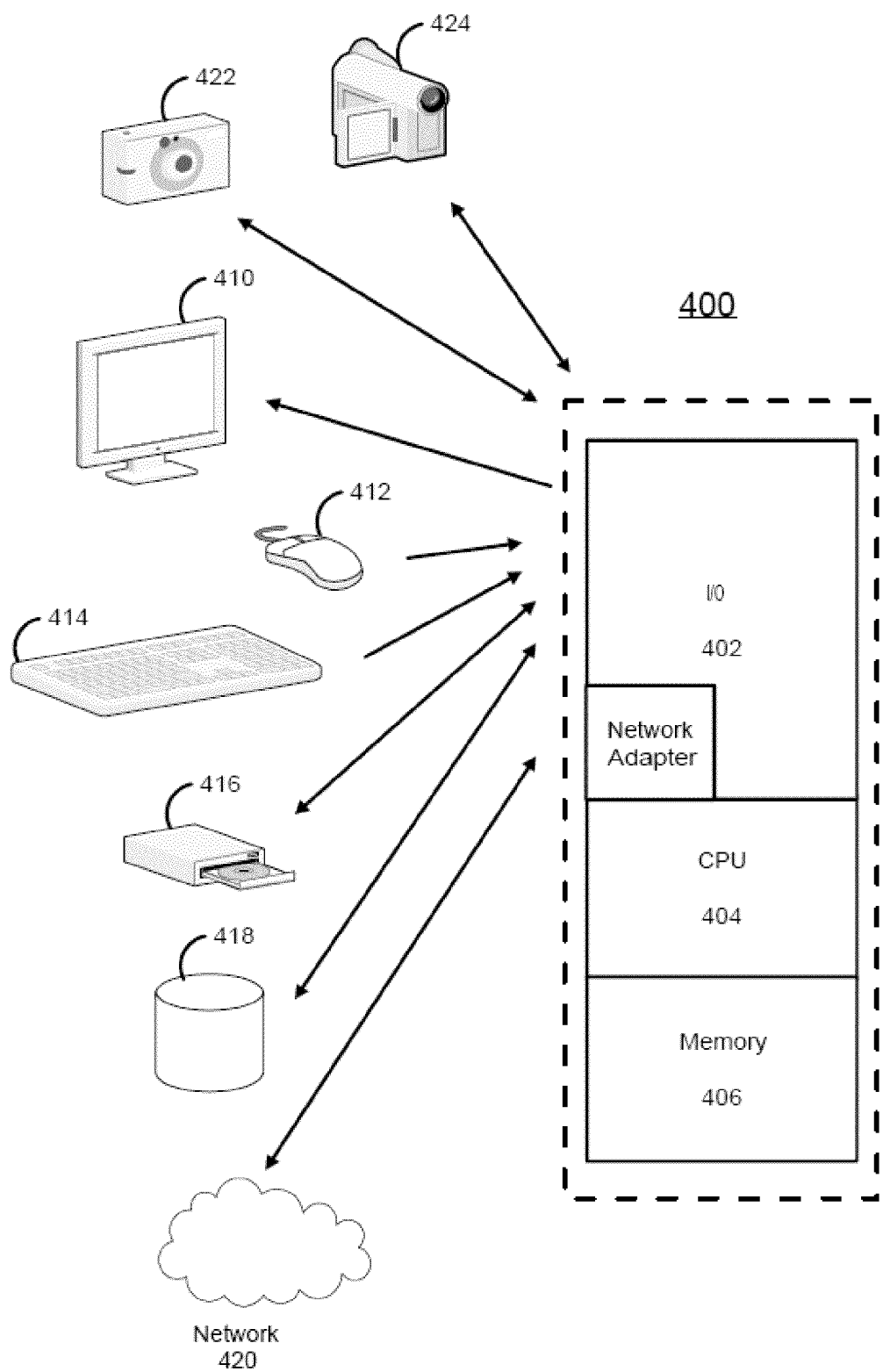
FIG. 5 illustrates components of an example computer system that can be useful in the implementation of the disclosed filters.

FIG. 5 illustrates components of an example system that can be useful in the implementation of the described technology. A general purpose computer system 400 is capable of executing a computer program product to execute a computer process. Data and program files may be input to the computer system 400, which reads the files and executes the programs therein. Some of the elements of a general purpose computer system 400 are shown in FIG. 5 including a Central Processing Unit (CPU) 404, input/output (I/O) section 402, and a memory section 406. It is understood that multiple computers and/or CPUs can be used. The computer system 400 may be a conventional computer, a distributed computer, or any other type of computer. The various image filters described herein are optionally implemented in software devices loaded in memory 406, stored on a configured DVD/CD-ROM 416 or storage unit 418, and/or communicated via a wired or wireless network 420. Digital images or video can also be supplied by a digital camera 422 or a video camera 424, thereby transforming the computer system 400 in FIG. 5 to a special purpose machine for implementing the described operations.

The I/O section 402 is connected to one or more user-interface devices (e.g., a keyboard 414, mouse 412 and display unit 410), a disk storage unit 418, and DVD/CD-ROM 416 (removable storage medium). It is understood that other memory devices can be coupled to the computer system, for example a floppy drive unit, a tape drive unit, or other storage medium drive units. The I/O section 402 includes a network adapter that is capable of connecting the computer system to a network 420. Examples of such computer systems include but are not limited to personal computers offered manufacturers of Intel-compatible computing systems, PowerPC-based computing systems, ARM-based computing systems, and other systems running a UNIX-based or other operating system. It is understood that computing systems may also embody devices such as Personal Digital Assistants (PDAs), mobile phones, still cameras, video cameras, tablet computers, gaming consoles, set top boxes, etc. It is also understood that such systems can be integrated into more complex systems such as robots, machine vision systems, unmanned vehicles and the like.

When used in a network environment, the computer system 400 is connected (by wired connection or wirelessly) to a network 420 through the network interface. In a networked environment, program modules and/or data or portions thereof, may be stored in a remote memory storage device. It is appreciated that the network connections shown are exemplary and other means of and communications devices for establishing a communications link between the computers may be used.

Offline Trained Detection

The filters disclosed above (ASEF, MOSSE, cost function minimizing filters) can be used in off-line scenarios to provide object detection capabilities in a wide variety of applications. Several applications are disclosed herein. It is understood that other applications are possible without departing from the scope of this disclosure.

Eye Finding/Localization

Generally, eye finding algorithms return the pixel coordinates of the center of the left and right eyes in frontal, or near frontal, face images. To be counted as a success, the system must return the true eye location to within some tolerance, typically measured as a fraction of the interocular distance, i.e., the distance between the centers of the eyes. Two variants of eye localization are considered here. The first presumes accurate prior knowledge, in essence assuming the true eye locations are already known to within a modest number of pixels. This obviously easier task arises in practice when face detection accurately locates the whole face. This task can be well solved using several filtering methods. The more difficult task is to accurately locate the left and right eye on a face given no prior constraints, and it is on this task that the superior performance of the filters disclosed herein (e.g., ASEF) becomes apparent.

The Viola and Jones cascade classifier has been adopted by many researchers for eye detection. One such system, designed by Castrillon-Santana, et al., uses a cascade classifier in conjunction with skin tone analysis. On the easier task where an approximate eye location is known, the cascade classifier performs well. However, when the approximate location constraint is removed, the cascade classifier produces many false detections and consequently performs poorly.

Gabor jets have also been studied extensively as an eye localization technique. When compared to ASEF filters, a typical Gabor jet based eye detector can be at least 20 times as computationally demanding and is only applicable to the easier problem where the eye location is approximately known.

A large family of correlation filters have been developed in an attempt to improve the response to a variety of input stimuli. For example, Synthetic Discriminant Functions (SDF), Minimum Variance Synthetic Discriminant Functions (MVSDF), Minimum Average Correlation Energy (MACE) and Optimal Tradeoff Filters (OTF). All four of these methods are similar in the way that they are trained. Specifically, they all require a zero/one (target/non-target) constraint on each training image. It has been found that these hard constraints are unnecessary and can even be detrimental for producing robust correlation filters. Unconstrained correlation filters such as Maximum Average Correlation Height (MACH) and Unconstrained Minimum Average Correlation Energy (UMACE) relax these constraints and instead favor high correlation responses on the average training image.

The following experiments compare ASEF to two common optimal tradeoff filters. The first type of filter, OTF, is based on the SDF formulation which imposes hard constraints on the output of the filter. The second type of optimal tradeoff of filter is a UMACE filter.

ASEF filters, as discussed above, differ from prior correlation filters in that the convolution theorem is exploited to greatly simplify the mapping between the input training image and the output correlation plane. In the Fourier domain the correlation operation becomes a simple element-wise multiplication, and therefore each corresponding set of Fourier coefficients can be processed independently. The resulting computations also naturally account for translational shifts in the spatial domain. As a result the entire correlation output can be specified for each training image.

The first major difference between the filters discussed above and ASEF filters is that ASEF filters are over constrained. Where SDF only specifies a single "synthetic correlation value" per training image, ASEF filters are trained using response images that specify a desired response at every location in each training image. This response typically is a bright peak centered on the target object of interest. One consequence of completely specifying the correlation output is a perfect balance between constraints and degrees of freedom for each training image, and therefore a complete "exact filter" is determined for every training image. Over-fitting is avoided by averaging the filters defined from each of the N training images. The UMACE filter also averages to avoid over-fitting, but there the similarity ends, since UMACE averages the training images while ASEF averages a set of exact filters.

Finally, ASEF filters provide much more freedom when selecting training images and when specifying the synthetic output. A benefit is that the training images need not be centered on the target. For each training image, the desired filter output is specified, and peak is placed wherever the target appears. Because the correlation peak moves in lock-step with the targets in the training images, all the exact filters are consequently registered by inverting the correlation process. This increases training flexibility, allowing customization of the desired response for each training image. For example, training images may have multiple targets per training image as long as the synthetic output contains multiple corresponding peaks.

As discussed above, ASEF filters perform best when trained on as many images as possible. In the following examples, the training set is augmented by introducing perturbations (e.g., random similarity transforms) as part of simulating the face detection process. In general, image transformations that introduce small variations in rotation, scale, and translation are beneficial to producing robust ASEF filters because they expose the filter to a greater variety of images. This family of transforms also focuses the filter on regions near the peaks, therefore producing a filter that emphasizes the image data near the target object.

All experiments used the FERET dataset (see e.g., http://www.nist.gov/humanid/feret/feret_master.html). This dataset contains 3,368 images of 1,204 people, with manually selected eye coordinates for each image. For these experiments, the FERET data set was randomly partitioned by subject into two sets of 602 people and 1699 images each. One of these sets was further partitioned by image into a training set with 1024 images and a validation set with 675 images. The training and validation sets were used to tune the algorithms. The other set of 602 people was sequestered during training and used as a testing set.

Faces were initially found in all images using the OpenCV face detector (see e.g., http://opencv.willowgarage.com/wiki/). This detector places the eyes very close to their true location most of the time, which made eye detection too easy for adequate testing of alternative eye finding methods. To make the eye localization problem more difficult, face detection is simulated by first aligning the faces to produce 128× 128 images with the eyes located at (32.0; 40.0) and (96.0; 40.0), and then applying a random similarity transform that rotates by up to ±π/16, scales by up to 1.0±0.1, and translates by up to ±4:0 pixels. Each of the initial 1024 training images was randomly perturbed 8 times yielding 8192 training images.

For the correlation filters, each image tile was normalized by first taking the log(log(v+1)) of the pixel values to reduce the effect of shadows and intense lighting, and then normalizing the values to have a mean of 0.0 and a squared sum of 1.0, to give the images a consistent intensity. Finally, a cosine window is applied to the image which reduces the frequency effects of the edge of the image when transformed by the Fast Fourier Transform (FFT). ASEF was trained on the full 128× 128 image tile, while the other correlation filters were trained on 64×64 image centered on an eye. Localization is performed by correlating a testing or validation image with the left and right filters and selecting the global maximum in the correlation output.

Evaluation of the eye location algorithms is based on the distance from the manually selected eye coordinate, normalized by the interocular distance. For example, the left eye normalized distance is computed as follows:

$$D = \frac{\|P_l - M_l\|}{\|M_l - M_r\|}$$

Where D is the normalized distance, $P_1$ is the predicted eye location from the algorithm and $M_1$ and $M_r$ are the manually selected left and right eye coordinates. An operating point of D<0.10 was selected as the criteria for a successful localization. This corresponds to a target that is approximately the size of the human iris. Results are shown for the left eye only. It is understood that the same techniques could be used to locate the right eye without departing from the scope of this disclosure.

The following experiment looks at the more difficult problem of finding an eye when the approximate location of the eye is not known a priori. This is relevant to many other vision problems, like generalized object detection, where the location of the object in the scene may be unpredictable. The correlation filters were trained and configured using the same training sets, validation sets, and parameters. The search space includes the entire image.

Figure 6:
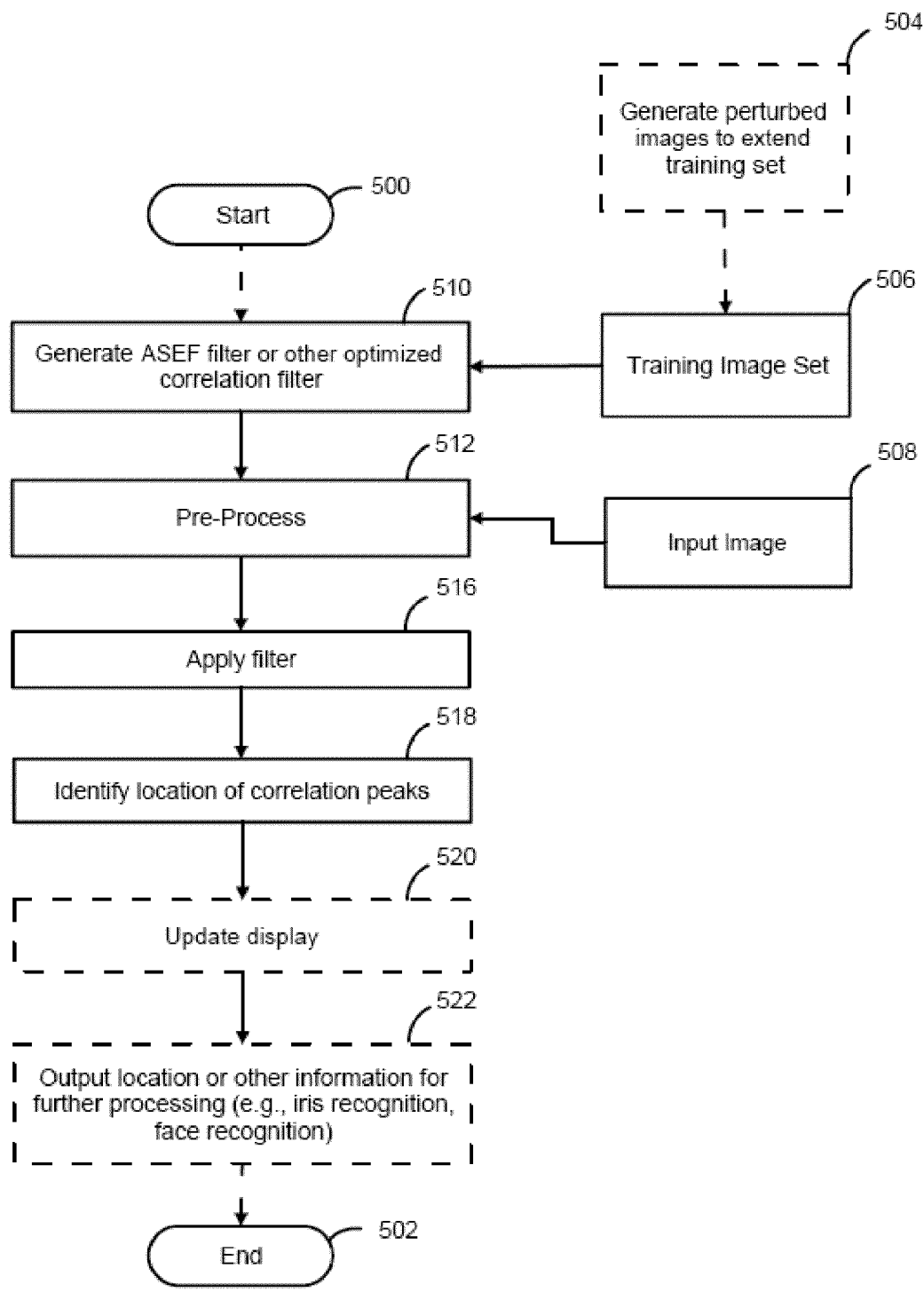
FIG. 6 is a flow chart showing the basic eye localization process.

FIG. 6 is a flow chart showing the basic eye localization process. An ASEF filter is generated as shown by block 510. It is understood that the other filter types disclosed above (MOSSE or cost function minimizing filter with gradient descent) could be used in the alternative. The filter is trained using training image set 506. Perturbed images are optionally generated as shown by block 504. An input image (with unknown eye location) is supplied as shown by block 508. The input image is pre-processed as needed as discussed above as shown by block 512. The filter is applied to the input image as shown by block 516. The resulting output is then scanned for the location of one or more correlation peaks as shown by block 518. In this case, a single correlation peak should identify the location of the left eye.

Once an object location is identified, the system can then utilize this information in a variety of ways. For example, the system can optionally update a display with a marker to highlight the detected object as shown by block 520. The system can also output the location to other system modules as shown by block 522. For example, an area of the image surrounding the location can be extracted for iris recognition, face recognition or other image processing. For systems with cameras having pan-tilt-zoom (PTZ) controls, the object location information can be used to control camera PTZ. It is understood that a wide variety of applications can be used in connection with the disclosed object detection techniques.

Figure 7:
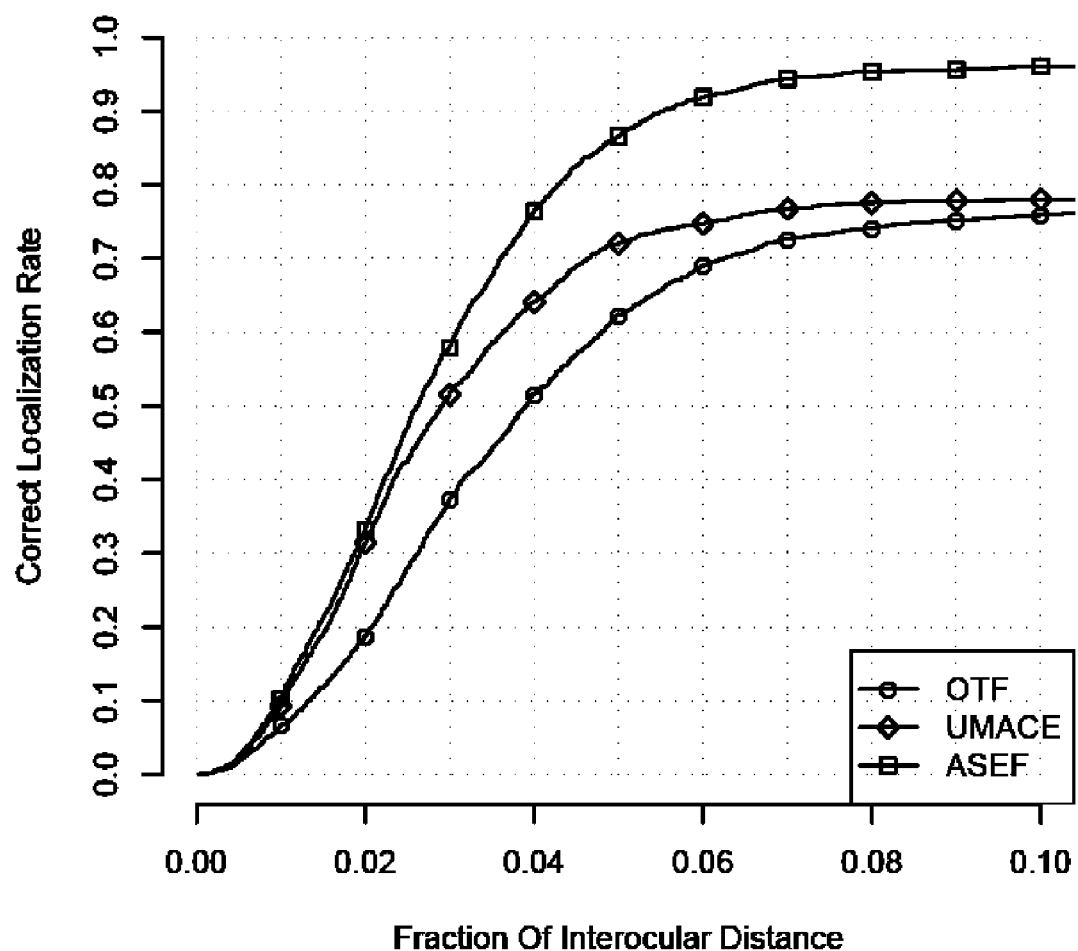
FIG. 7 is a graph showing the eye localization performance of ASEF filters compared to OTF and UMACE methods.

FIG. 7 is a graph showing the eye localization performance of ASEF filters compared to OTF and UMACE methods. The vertical access indicates the fraction of eye correctly located. The horizontal axis indicates the size of the localization target relative to the interocular distance. FIG. 6 shows that ASEF filters are considerably more accurate than the other methods. It was noted that the OTF and UMACE filters produced strong responses for the correct eye, but were often distracted by stronger responses to other locations of the face, typically the "wrong" eye or the nose. This result is almost expected because the left and right eyes have similar appearances.

In contrast, the ASEF filters rarely detected the wrong eye. The correlation outputs for ASEF typically show a very high response to the correct eye, and a very low or non-existent response to the "wrong" eye. The majority of the ASEF mistakes tend to be responses to background or to unusual features of the face such as dark rimmed glasses. ASEF is the only method tested in experiment that did not require prior knowledge of the location of the eye to achieve good performance.

It is believed that the improved performance is caused by at least two features unique to the ASEF training process. First, ASEF filters are trained on the entire face image, including the "wrong" eye, nose, mouth, etc. OTF and UMACE, on the other hand, were centered on the correct eye and therefore had no exposure to these or other distractions. Second, because ASEF completely specifies the correlation output for the entire training image, it specifies both the high response for the correct eye and the low responses for the rest of the face. Every exact filter that becomes part of the "average" therefore has learned to ignore these other features. The result is that the most common distractors are rarely associated with mistakes.

The primary performance bottle neck is the computation of the FFT. With an ASEF filter, both the left and right eye filters can be combined into one complex filter where the real part corresponds to the left eye and the imaginary part corresponds to the right eye. By pre-computing the FFT of this combined filter, eye detection can be performed using just two FFTs by using one FFT to transform the image into the Fourier domain, computing the element-wise multiplication, and then using the other FFT to compute the correlation plane.

Real Time People Detection

To detect people in video, thousands of detection windows must be evaluated every second. The vast majority of those windows correspond to background and must be disregarded. Consequently, a classifier must be constructed that reliably rejects the vast majority of detection windows presented to it while simultaneously avoiding the mistake of rejecting windows in which a person is actually present. This can be a major challenge.

In principle, it makes sense to train a detector on every possible detection window in every frame of labeled video. However, doing this for commonly used types of detectors such as the Viola Jones cascade classifier is often too computationally demanding. Instead, these algorithms are trained iteratively using boosting. While this type of boosted training is clever, and can after many iterations generate very good detectors, the process is hard to automate and in practice can be problematic.

In contrast, the techniques disclosed herein lend themselves naturally to efficient training over every possible detection window. This is because the classifier is based upon convolution, and training can be accomplished efficiently by exploiting the Convolution Theorem. In the following example, the filter was trained on 3,145,728 detection windows in under 12 seconds.

One challenge in creating a filter based detector is the problem of scale changes. In the PETS2009 dataset (See e.g., http://www.cvg.rdg.ac.uk/PETS2009/), the heights of people vary from a minimum of 50 pixels to a maximum of 150 pixels. This presents two problems. The first is for training, which assumes the people are approximately the same size. The second is in testing, where the filter needs to be applied at multiple scales. The solution to both these problems leverages the geometry of the camera setup. Because the camera is elevated and looking down at an approximately planar scene, the y location of the person is a good predictor of a persons height.

The scene is divided into regions with approximately constant scale. In this case, four regions are used. The four regions are then rescaled so that people are approximately the same height in each. The rescaled regions have much less variance in proportion to the average height than the full frame. These regions also focus the detection effort on the side walk area of the image which covers most of the action in the videos.

Another challenge stems from the fact that a person's appearance is greatly affected by clothing. Many detection algorithms solve this problem by focusing on gradient based features. The gradient based features focus the detection process on edge information and detection is therefore less dependent on the absolute intensity of the pixels. Images are therefore preprocessed to produce the gradient magnitude for each pixel in the detection region using standard Sobel operators. This step creates a new image where the people are defined primarily by there outline. The images are then value normalized by taking the log of the pixel values and scaling the image to have a mean value of zero and unit length.

Using ASEF, exact filters are computed for every training image and then averaged. Aggregating a collection of simple filters converges on a filter that minimizes the variance error. A more intuitive way to think about the averaging process is that it keeps features that are consistent across many filters while averaging out features that are idiosyncratic to a single instance. Therefore, the final ASEF filter is computed as:

$$h = \frac{1}{N}\sum_{i=1}^{N} h_i = \frac{1}{N}F^{-1}\left(\sum_i H_i\right)$$

Where N is the number of training images. Averaging has some nice properties which makes training an ASEF filter fast and easy to compute: it does not overfit the training data, it only requires a single pass for each image, and it only requires enough memory to store one filter.

As discussed above, ASEF is that it typically requires a large number of training images to converge to a good filter. Two methods were used to reduce the total number of frames required for training. The first is to use perturbed images generated from the original training set. The second technique which improves the stability of the exact filters by constructing exact filters using the largest frequencies in F, that contain 95% of the total energy. The latter of these techniques has a similar effect to regularization. As explained above, an ASEF exact filter is computed as follows:

$$H_i = \frac{G_i}{F_i}$$

Where H is the exact filter, F is the training image and G is the synthetic output. Removing the small frequencies appears to remove much of the "noise" in the exact filter. In tests, this heuristic allowed ASEF filters to be trained on fewer images without adversely affecting their accuracy or appearance.

In the following example, the ASEF filter is trained on 32 frames of a video sequence. Each frame is divided into 4 detection regions, and each detection region is randomly perturbed 4 times. Thus, the ASEF filter is trained on 512 total images (32×4×4=512). Each training window is 96×64 pixels. This gives a grand total of 3,201,024 pixels or detection windows. Training took approximately 11.5 seconds running on an Apple MacBook Pro with a 2.4 Ghz Intel Core 2 Duo processor. This included reading in the original frames, extracting and randomly permuting the detection windows, computing the ASEF filter, and writing the trained filter to disk.

Figure 8:
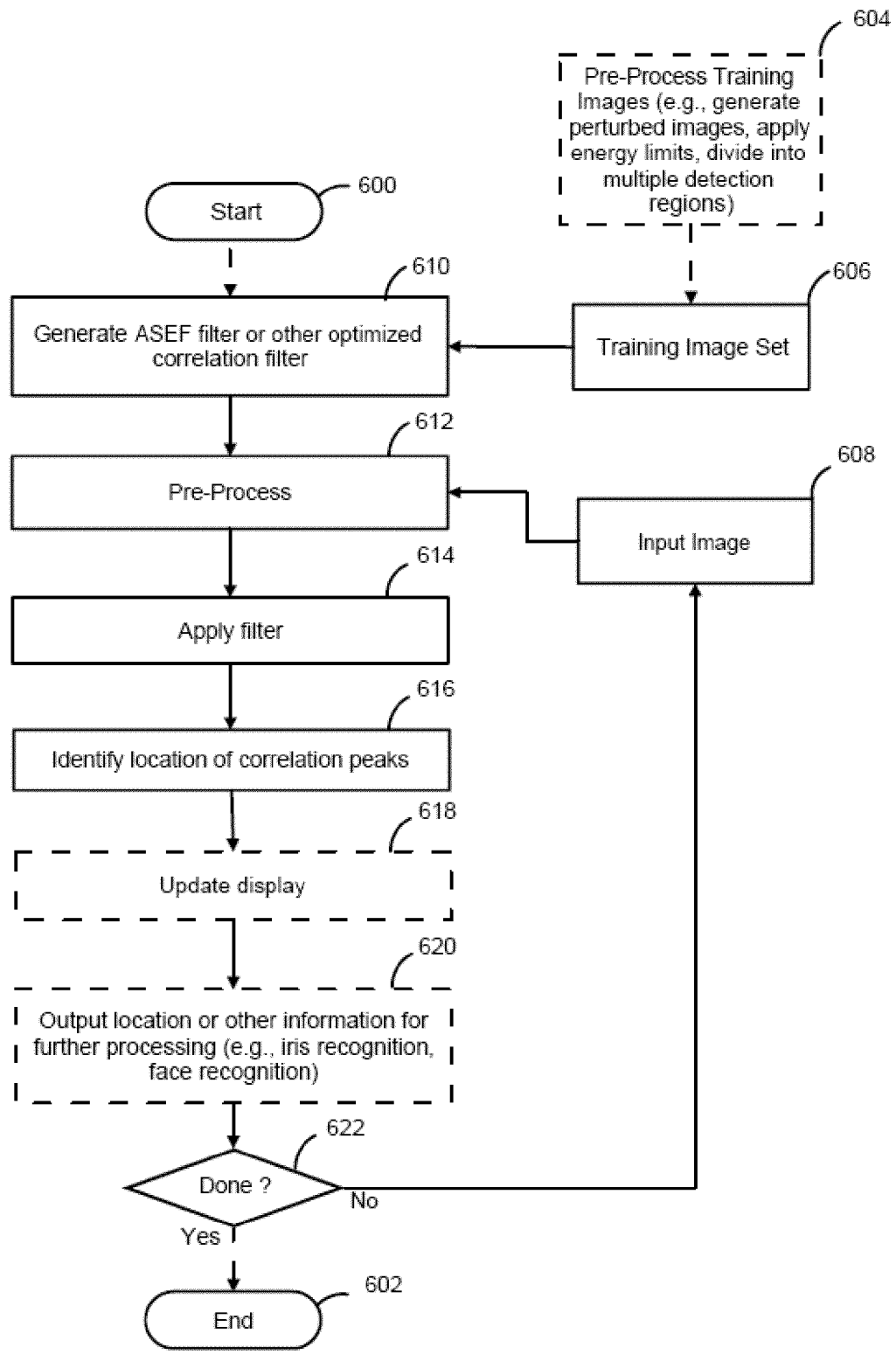
FIG. 8 is a flow chart showing the basic real time people detecting process.

Object detection using an ASEF filter is simple and fast. FIG. 8 is a flow chart showing the real time people detecting process. An ASEF filter is generated as shown by block 610. It is understood that the other filter types disclosed above (MOSSE or cost function minimizing filter with gradient descent) could be used in the alternative. The filter is trained using training image set 606. The training images are pre-processed as discussed above (e.g., perturbed images are optionally generated, energy limits are applied, each image is divided into multiple detection regions are rescaled as need) as shown by block 604. An input image (video frame) is supplied as shown by block 608. The input image is pre-processed as needed as discussed above (e.g., divide into multiple regions, rescale as needed) as shown by block 612. The filter is applied to each region as shown by block 614. The resulting outputs are then scanned for the location of correlation peaks as shown by block 616. In this case, each correlation above a pre-defined threshold will identify the location of a person. The process is repeated on subsequent video frames as shown by block 622.

Once an object location is identified, the system can then utilize this information in a variety of ways. For example, the system can optionally update a display with a marker to highlight the detected object as shown by black 618. The system can also output the location to other system modules as shown by block 620. For example, an area of the image surrounding the location can be extracted for iris recognition, face recognition or other image processing. For systems with cameras having pan-tilt-zoom (PTZ) controls, the object location information can be used to control camera PTZ. It is understood that a wide variety of applications can be used in connection with the disclosed object detection techniques.

Figure 9:
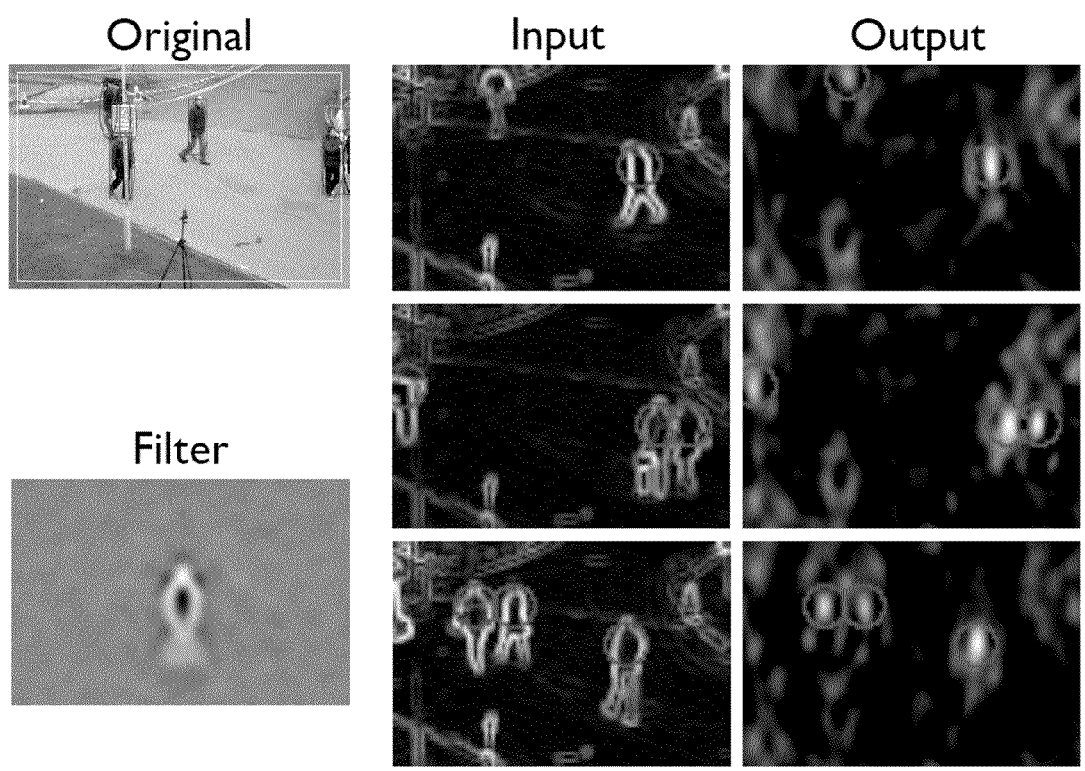
FIG. 9 shows several detection regions used in the people detecting process.

FIG. 9 shows several detection regions used in the people detection process. The gradient magnitude images (labeled as "input") are convolved with the ASEF filter using the FFT method. The resulting correlation (labeled as "output") has peaks where people are present and suppressed responses to image background: The correlation output is then scanned for local maxima. Any maxima that exceed a user defined or pre-defined threshold are considered a detection.

Figure 10:
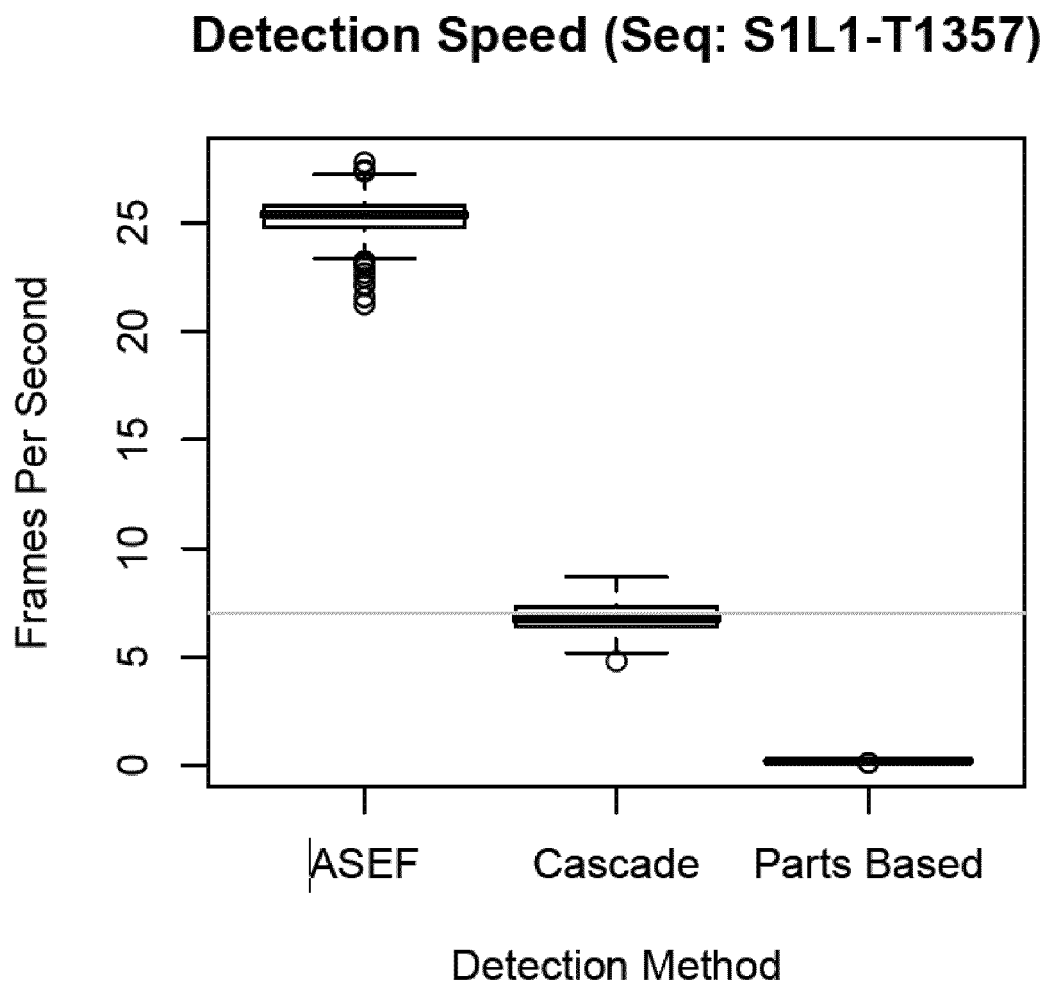
FIG. 10 compares the rate at which the detectors processed frames in a sample video sequence.

The most obvious advantage of filter based detectors is the speed at which they can process images. FIG. 10 compares the rate at which the detectors processed frames in the S1L1 T1357 sequence. The ASEF filter detector is the clear winner with a median rate of 25.37 frames per second. The Viola and Jones based Cascade comes in second with a median rate of 6.75 frames per second which is actually very close to the frame rate of the video (7 frames per second). The parts based method was much slower than real time and took on average 5.2 seconds to process each frame.

Figure 11:
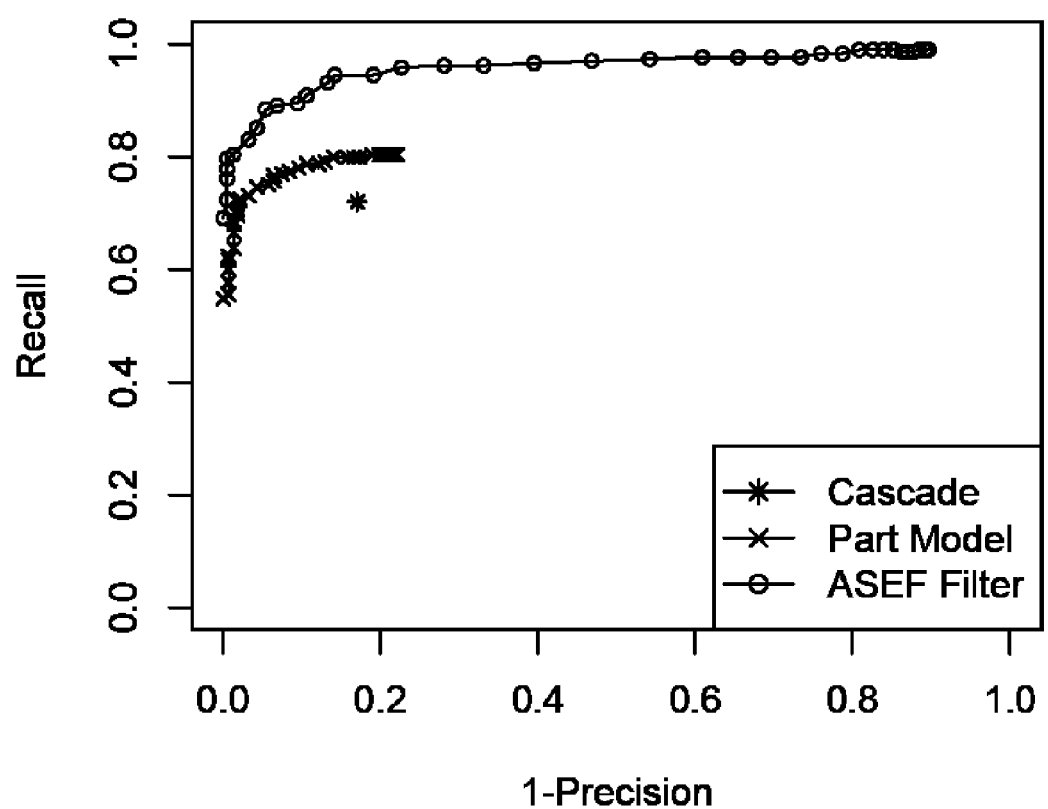
FIG. 11 shows quantitative results of various detection algorithms.

FIG. 11 shows quantitative results of various detection algorithms using standard Recall/1-Precision curves. FIG. 11 shows that ASEF has a clear advantage in the sparse crowd of sequence S2L1-T1234.

Dynamic Tracking

The filters disclosed above (ASEF, MOSSE, cost function minimizing filters) can be used in dynamic scenarios to provide tracking capabilities in a wide variety of applications. Several applications are disclosed herein. It is understood that other applications are possible without departing from the scope of this disclosure.

Visual tracking has many practical applications in video processing. When a target is located in one frame of a video, it is often useful to track that object in subsequent frames. Every frame in which the target is successfully tracked provides more information about the identity and the activity of the target. Because tracking is easier than detection, tracking algorithms can use fewer computational resources than running an object detector on every frame.

The following disclosure is directed to simple tracking strategy. The targets appearance is modeled by adaptive correlation filters, and tracking is performed via correlation. Naive methods for creating filters, such as cropping a template from an image, produce strong peaks for the target but also falsely respond to background. As a result they are not particularly robust to variations in target appearance and fail on challenging tracking problems. ASEF, MOSSE and cost function minimizing filters disclosed above produce filters that are more robust to appearance changes and are better at discriminating between targets and background. The result is a much stronger peak which translates into less drift and fewer dropped tracks. In the disclosure above, such filters are trained offline and are used for object detection or target identification. These techniques can be modified to accommodate online training in an adaptive manor for visual tracking. The result is tracking with state of the art performance that retains much of the speed and simplicity of the underlying correlation based approach.

Despite the simplicity of the approach, tracking based on modified ASEF or MOSSE filters performs well under changes in rotation, scale, lighting, and partial occlusion. The Peak-to-Sidelobe Ratio (PSR), which measures the strength of a correlation peak, can be used to detect occlusions or tracking failure, to stop the online update, and to reacquire the track if the object reappears with a similar appearance. More generally, these advanced correlation filters achieve performance consistent with the more complex trackers mentioned earlier; however, the filter based approach is over 20 times faster and can process 669 frames per second.

Filter based trackers model the appearance of objects using filters trained on example images. The target is initially selected based on a small tracking window centered on the object in the first frame. From this point on, tracking and filter training work together. The target is tracked by correlating the filter over a search window in next frame; the location corresponding to the maximum value in the correlation output indicates the new position of the target. An online update is then performed based on that new location.

One issue with the FFT convolution algorithm is that the image and the filter are mapped to the topological structure of a torus. In other words, it connects the left edge of the image to the right edge, and the top to the bottom. During convolution, the images rotate through the toroidal space instead of translating as they would in the spatial domain. Artificially connecting the boundaries of the image introduces an artifact which effects the correlation output.

This effect is reduced by preprocessing. First, the pixel values are transformed using a log function which helps with low contrast lighting situations. The pixel values are normalized to have a mean value of 0.0 and a norm of 1.0. Finally, the image is multiplied by a cosine window which gradually reduces the pixel values near the edge to zero. This also has the benefit that it puts more emphasis near the center of the target.

Figure 12:
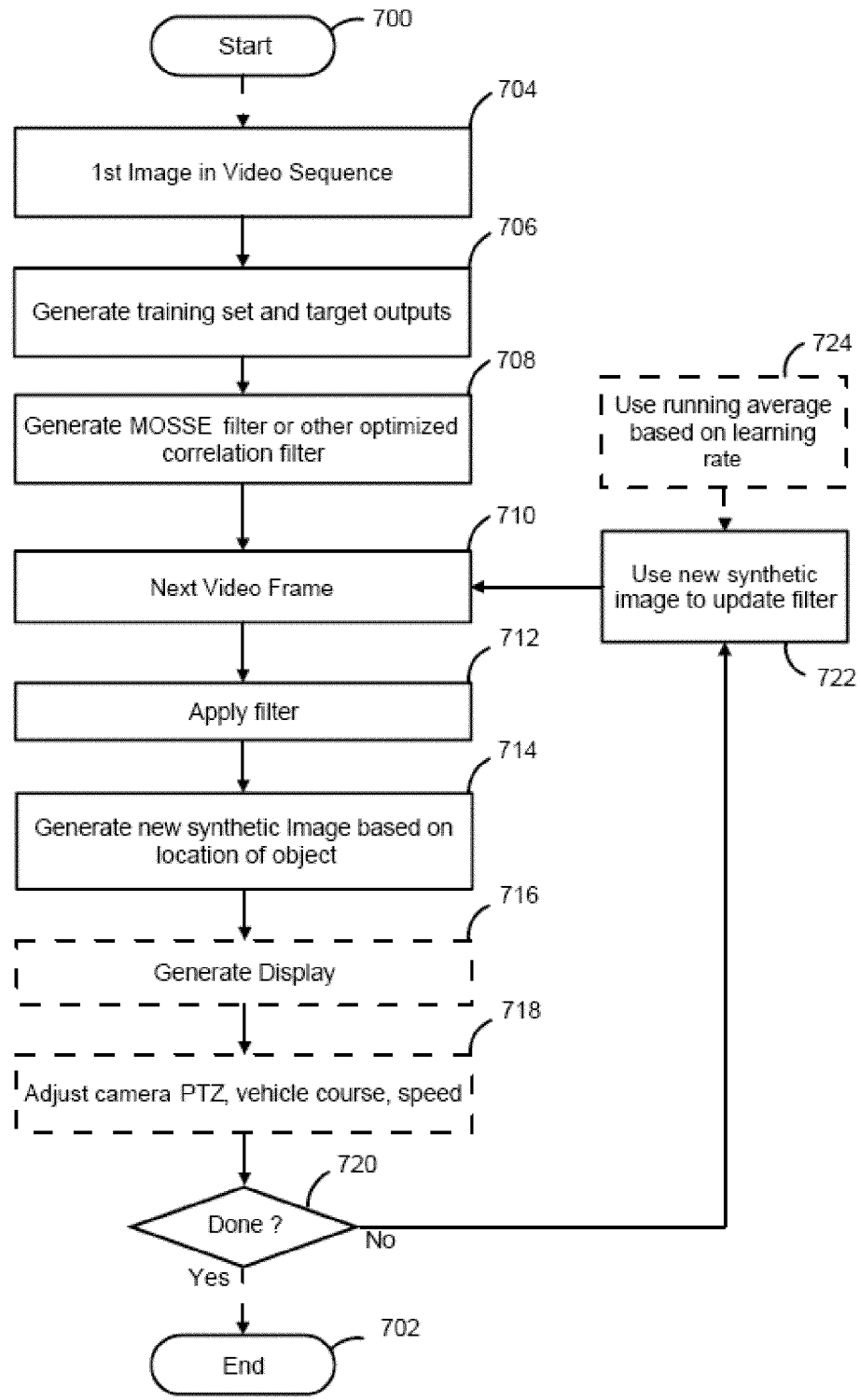
FIG. 12 is a flowchart showing the basic dynamic tracking procedure.

FIG. 12 is a flowchart showing the basic dynamic tracking procedure. A first image or frame of video is supplied as shown by block 704. The training set is constructed using random affine transformations to generate eight small perturbations ($f_i$) of the tracking window in the initial frame. Target outputs ($g_i$) are also generated as disclosed above with their peaks corresponding to the target center. This is shown generally by block 706. A MOSSE filter is generated as shown by block 708. It is understood that other optimized correlations filters could be used (e.g., ASEF or cost function minimizing filters). The next video frame is received at block 710. The filter is applied as shown by block 712. The filter output is used to locate the object in the video frame. Based on the location, a display output can be optionally generated or updated as show by block 716. The location is also used to generate a new synthetic image (target image) as shown by block 714. The process is repeated for subsequent video frames as shown by block 720. The new synthetic image is used to update the filter as shown by block 722. That is, the new synthetic image is used as a target image to update the filter training.

Instead of retraining the filter for every new frame, the tracking system can perform a simpler and faster update to the filter. Because MOSSE and ASEF filters are accumulated primarily using a simple sum or a simple average, it is possible to update the filters by simply adding the new training data to those sums. The updated filter can use a weight sum to add the current training data to the current state of the filter in a way that emphasizes more recent frames. This eliminates the need to keep previous training data in memory and allows the filter to continually adapt to the changing appearance of the target object. It is also understood that the system can intermittently or periodically skip an update for one or more frames to reduce computation time (at the expense of tracking accuracy). For example, the system can use a filter quality measure such as the Peak To Side-lobe ratio (PSR) to determine when filter updates are necessary.

During tracking, a target can often change appearance by changing its rotation, scale, pose, by moving through different lighting conditions, or even by undergoing nonrigid deformation. Therefore, filters need to quickly adapt in order to follow objects: A running average can be used for this purpose as shown by block 724. For example, the ASEF filter learned from Frame i is computed as:

$$H_i^* = \eta \frac{G_i \odot F_i^*}{F_i \odot F_i^*} + (1-\eta)H_{i-1}^*$$

and the MOSSE filter as:

$$H_i^* = \frac{A_i}{B_i}$$
$$A_i = \eta G_i \odot F_i^* + (1-\eta)A_{i-1}$$
$$B_i = \eta F_i \odot F_i^* + (1-\eta)B_{i-1}$$

where $\eta$ is the learning rate. This puts more weight on recent frames and lets the effect of previous frames decay exponentially over time. In practice, $\eta=0.125$ allows the filter to quickly adapt to appearance changes while still maintaining a robust filter. It is understood that the value of $\eta$ can be adjusted based on a variety of factors.

It is understood that object location information can optionally be used to control other systems or components as shown by block 718. For systems with cameras having pan-tilt-zoom (PTZ) controls, the object location information can be used to control camera PTZ. This can allow the camera to automatically track the object. For systems having cameras mounted to moving vehicles (e.g., ground vehicles, aerial vehicles . . . ) location information can be used to control camera PTZ as well as vehicle course and/or speed as shown by block 718. This can be accomplished without human intervention. For example, the vehicle can automatically change course, speed and camera settings so that the object remains within view of the camera (e.g., to provide a real time video feed of a tracked object). The tracking system can also function as an electronic tether such that the vehicle to which the camera is mounted follows the tracked object. The system can also output location or other information for further processing. For example, an area of the image surrounding the location can be extracted for object recognition or other image processing. It is understood that a wide variety of applications can be used in connection with the disclosed object tracking techniques.

Figure 13:
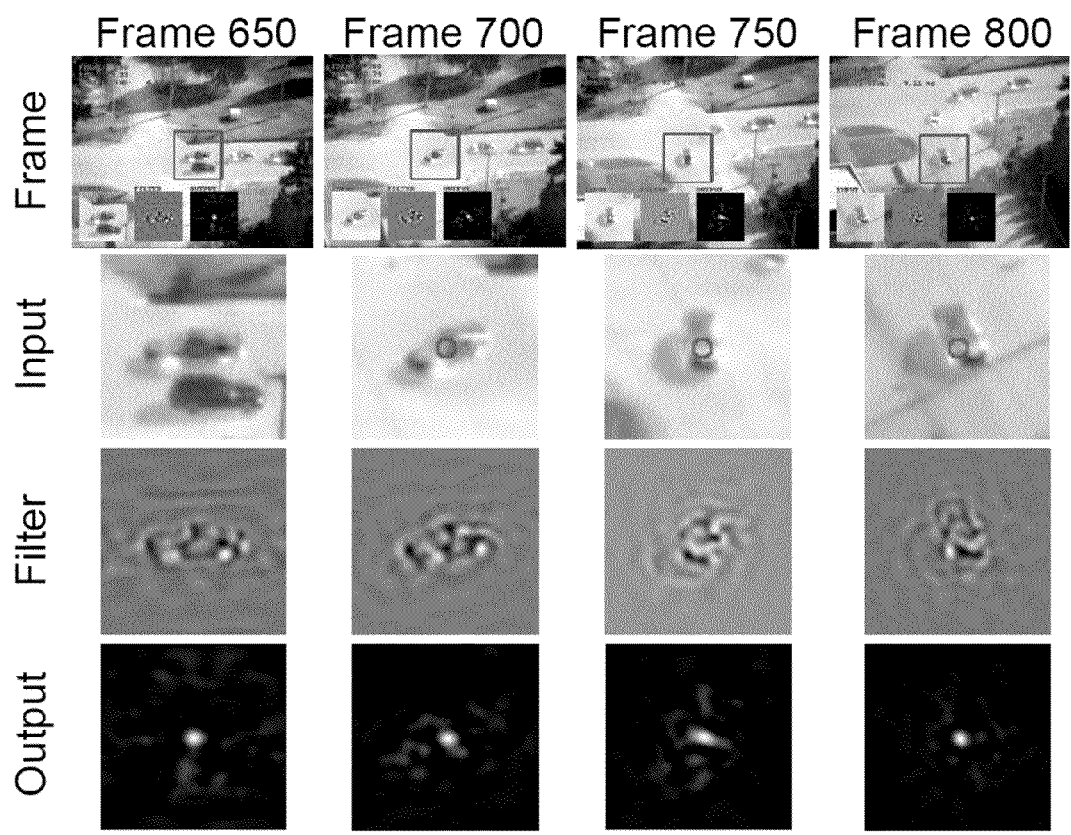
FIG. 13 shows the performance of the MOSSE tracker when tracking a vehicle in a thermal image collected by an aircraft.

FIG. 13 shows the performance of the MOSSE tracker when tracking a vehicle in a thermal video collected by an aircraft. The top row shows the original frame with overlaid tracking information. The second row shows the input image which is used to first track the object in the current frame and then it is used as training data to update the filter for the next frame. The circle is where the synthetic peak is located for the target correlation plane. The third row shows the filter used to locate the target object in the current frame. The last row shows the correlation output plane produced by correlating the input image with the filter. FIG. 13 also illustrates how the filter adapts to the changing appearance of the target object. In this particular example, the object (a ground based vehicle) has just turned left at an intersection. A camera PTZ, aerial vehicle course and/or speed adjustment may be required for continued tracking of the object. As discussed above, this is accomplished using the disclosed image filtering and tracking techniques without human intervention.

Figure 14:
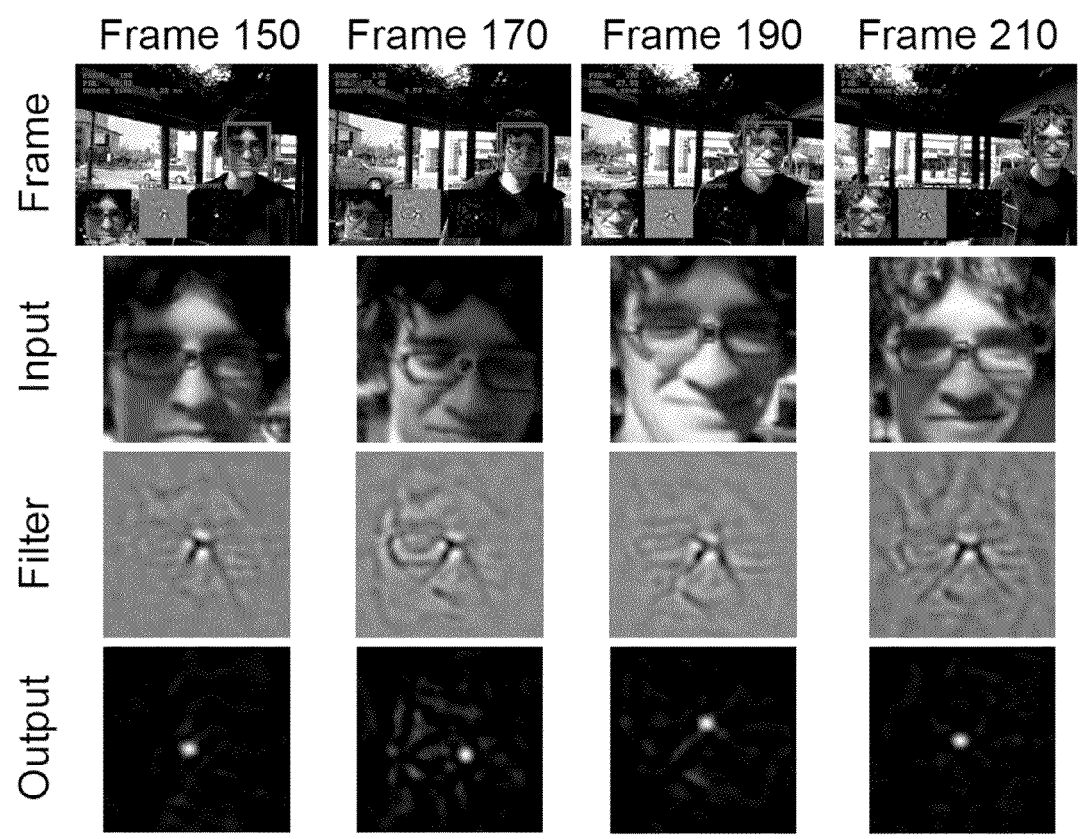
FIG. 14 shows the performance of the MOSSE tracker when tracking a face through complex pose and lighting changes.

It is understood that the same dynamic tracking techniques can be applied to other imagery. For example, FIG. 14 shows the performance of the MOSSE tracker when tracking a face through complex pose and lighting changes. The top row shows the original frame with overlaid tracking information. The second row shows the input image which is used to first track the object in the current frame and then it is used as training data to update the filter for the next frame. The circle is where the synthetic peak is located for the target correlation plane. The third row shows the filter used to locate the target object in the current frame. The last row shows the correlation output plane produced by correlating the input image with the filter. This figure also illustrates how the filter adapts to the changing appearance of the target object. In this particular example, the object (a person) is moving towards the camera. A camera PTZ adjustment may be required for continued tracking of the object. As discussed above, this is accomplished using the disclosed image filtering and tracking techniques without human intervention.

The embodiments described herein can be implemented as logical operations and/or modules in one or more systems. Such modules can be implemented as stand alone modules or can be integrated into other devices such as cameras, machine vision systems, robots and the like. The logical operations may be implemented as a sequence of processor-implemented steps executing in one or more computer systems and as interconnected machine or circuit modules within one or more computer systems. The resulting implementation is a matter of choice, dependent on the performance requirements of the underlying system implementing the described technology. Furthermore, it should be understood that logical operations may be performed in any order, unless explicitly claimed otherwise or a specific order is inherently necessitated by the claim language.

The above specification, examples and data provide a complete description of the structure and use of example embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A method of generating a correlation filter with respect to a target object, the method comprising:
   providing a plurality of training images, each training image being paired with an associated target correlation plane that reflects relative locations of images of the target object within the training image;
   processing each training image and target correlation plane pair and generating a final filter that is useable to generate a filtered output correlation plane of each training image, the final filter being selected to collectively minimize errors between the filtered output correlation plane of each training image and its associated target correlation plane.

2. The method of claim 1, wherein processing each training image and target correlation plane pair comprises:
   performing a correlation function and generating an exact filter for each training image;
   combining the exact filters for each of the plurality of training images and generating the final filter.

3. The method of claim 2, further comprising:
   transforming the plurality of training images and the associated target output images from a spatial domain to a frequency domain; and
   generating the exact filter for each training image in the frequency domain.

4. The method of claim 3, wherein the transforming is performed using a transforms that satisfies the Convolution Theorem.

5. The method of claim 4, further comprising dividing each target image by its associated training image and generating the exact filter for each training image.

6. The method of claim 2, wherein the exact filters are combined via an averaging function.

7. The method of claim 1, wherein processing each training image and target correlation plane pair comprises:
   solving for a final filter that collectively minimizes the sum of squared errors between the filtered output correlation plane of each training image and its associated target correlation plane.

8. The method of claim 1, wherein processing each training image and target correlation plane pair comprises:
   solving for a final filter using a gradient descent function to collectively minimize errors between the filtered output correlation plane of each training image and its associated target correlation plane.

9. The method of claim 1, further comprising regularizing the filter by increasing a value of every element in the energy spectrum of each training image with a regularization parameter.

10. The method of claim 1, further comprising:
    generating at least one perturbed image of the target object for each of the plurality of training images.

11. The method of claim 1, further comprising:
    training the final filter based on a plurality of frames in a video sequence;
    applying the final filter to a subsequent frame in a video sequence and determining whether an image of the target object is present in the subsequent video frame.

12. The method of claim 11, further comprising:
    dividing each video frame into a plurality of detection regions and applying the final filter to each region.

13. The method of claim 1, further comprising:
    training the final filter based on a first frame in a video sequence;
    applying the final filter to a subsequent frame in a video sequence and determining a location of an image of the target object;
    generating a new target correlation plane based on the target object image location; and
    updating the final filter based on the new target correlation plane.

14. The method of claim 13, further comprising:
    processing a plurality of video frames; and
    placing more emphasis on minimizing errors on newer video frames than older video frames.

15. The method of claim 11, further comprising:
    outputting the target object image location for controlling at least one of a camera pan-tilt-zoom (PTZ) setting, vehicle speed or vehicle course.

16. A system for generating a correlation filter with respect to a target object, the system comprising:
- an input configured for receiving a plurality of training images, each training image being paired with an associated target correlation plane that reflects relative locations of images of the target object within the training image;
- a processor configured to process each training image and target correlation plane pair and generate a final filter that is useable to generate a filtered output correlation plane of each training image, the final filter being selected to collectively minimize errors between the filtered output correlation plane of each training image and its associated target correlation plane.

17. The system of claim 16, wherein the processor is configured to solve for a final filter that collectively minimizes the sum of squared errors between the filtered output correlation plane of each training image and its associated target correlation plane.

18. The system of claim 16, wherein the processor is configured to solve for a final filter using a gradient descent function to collectively minimize errors between the filtered output correlation plane of each training image and its associated target correlation plane.

19. The system of claim 16, wherein the processor is configured to regularize the filter by increasing a value of every element in the energy spectrum of each training image with a regularization parameter.

20. The system of claim 16, wherein the processor is configured to
- generate at least one perturbed image of the target object for each of the plurality of training images.

21. The system of claim 16, wherein the processor is configured to train the final filter based on a plurality of frames in a video sequence;
- apply the final filter to a subsequent frame in a video sequence; and
- determine whether an image of the target object is present in the subsequent video frame.

22. The system of claim 16, wherein the processor is configured to divide each video frame into a plurality of detection regions and apply the final filter to each region.

23. The system of claim 16, wherein the processor is configured to train the final filter based on a first frame in a video sequence;
- apply the final filter to a subsequent frame in a video sequence;
- determine a location of an image of the target object;
- generate a new target correlation plane based on the target object image location; and
- update the final filter based on the new target correlation plane.

24. The system of claim 23, wherein the processor is configured to process a plurality of video frames; and
- place more emphasis on minimizing errors on newer video frames than older video frames.

25. The system of claim 23, wherein the processor is configured to output the target object image location for controlling at least one of a camera pan-tilt-zoom (PTZ) setting, vehicle speed or vehicle course.

26. A non-transient computer-usable medium having computer readable instructions stored thereon for execution by a processor to perform a method comprising:
- providing a plurality of training images, each training image being paired with an associated target correlation plane that reflects relative locations of images of the target object within the training image;
- processing each training image and target correlation plane pair and generating a final filter that is useable to generate a filtered output correlation plane of each training image, the final filter being selected to collectively minimize errors between the filtered output correlation plane of each training image and its associated target correlation plane.

27. The method of claim 1, where the training images include:
- a training image that does not include any images of the target object that is paired with an associated target correlation plane that reflects no relative locations of the target object;
- a training image that includes a single image of the target object that is paired with an associated target correlation plane that reflects the relative location of the single image of the target object; or
- a training image that includes a plurality of images of the target object that is paired with an associated target correlation plane that reflects the relative locations of the plurality of images of the target object.

* * * * *